United States Patent
Yu et al.

(10) Patent No.: US 9,304,564 B2
(45) Date of Patent: Apr. 5, 2016

(54) COMPUTER SYSTEM AND POWER MANAGEMENT METHOD THEREOF

(71) Applicant: Quanta Computer Inc., Tao Yuan Shien (TW)

(72) Inventors: Chun-Jie Yu, Keelung (TW); Yu-Hui Chen, Tao Yuan Shien (TW); Kuang-Peng Lin, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 190 days.

(21) Appl. No.: 14/301,605

(22) Filed: Jun. 11, 2014

(65) Prior Publication Data

US 2015/0293569 A1 Oct. 15, 2015

(30) Foreign Application Priority Data

Apr. 15, 2014 (TW) .............................. 103113763 A

(51) Int. Cl.
*G06F 1/26* (2006.01)
*G06F 1/32* (2006.01)
*H02J 7/04* (2006.01)

(52) U.S. Cl.
CPC .............. *G06F 1/263* (2013.01); *G06F 1/3212* (2013.01); *H02J 7/04* (2013.01)

(58) Field of Classification Search
CPC ........... G06F 1/263; G06F 1/3212; H02J 7/04

USPC .......................................................... 713/300
See application file for complete search history.

(56) References Cited

U.S. PATENT DOCUMENTS

| | | | | |
|---|---|---|---|---|
| 2009/0027013 A1* | 1/2009 | Odaohhara | ........... | H02J 7/0068 320/160 |
| 2011/0047396 A1* | 2/2011 | Kawamoto | .............. | G06F 1/263 713/322 |
| 2012/0139345 A1* | 6/2012 | Ye | .......................... | H02J 7/0068 307/66 |
| 2012/0139500 A1* | 6/2012 | Ye | .......................... | H02J 7/0068 320/135 |
| 2013/0339757 A1* | 12/2013 | Reddy | ................... | G06F 1/3212 713/300 |
| 2014/0266013 A1* | 9/2014 | Becker | ..................... | H02J 7/007 320/107 |
| 2014/0268556 A1* | 9/2014 | Lam | ......................... | H02J 7/00 361/679.55 |
| 2014/0281591 A1* | 9/2014 | Uan-Zo-Li | .............. | G06F 1/263 713/300 |
| 2014/0355308 A1* | 12/2014 | Uan-Zo-Li | ............. | H02M 1/32 363/15 |
| 2014/0380073 A1* | 12/2014 | Yu | ......................... | G06F 1/3206 713/322 |

* cited by examiner

*Primary Examiner* — Vincent Tran
(74) *Attorney, Agent, or Firm* — Rabin & Berdo, P.C.

(57) ABSTRACT

A computer system and a power management method thereof are disclosed. The computer system comprises a smart charger and an embedded controller (EC). The smart charger has a voltage turbo boost (VTB) function. The EC enables or disables the VTB function to protect a battery from damage according to a current remaining capacity and a battery decline ratio of the battery.

18 Claims, 4 Drawing Sheets

COMPUTER SYSTEM AND POWER MANAGEMENT METHOD THEREOF

This application claims the benefit of Taiwan application Serial No. 103113763, filed Apr. 15, 2014, the subject matter of which is incorporated herein by reference.

BACKGROUND OF THE INVENTION

1. Field of the Invention

The invention relates in general to an electronic device, and more particularly to a computer system and a power management method thereof.

2. Description of the Related Art

High-end notebook computer can use a voltage turbo boost (VTB) function of a smart charger to control the battery to provide power. After the VTB function is enabled, if system total power consumption is larger than a system constant power, the notebook computer can be powered by an AC adapter and the remaining power shortage can be powered by the battery.

Due to cost consideration and the popularity of the VTB function, the design and choice of AC adapter are directed towards slimness and lightweight. If the rated capacity of an AC adapter is too small, the AC adapter cannot enable a smart charger. A corresponding enabling input current is required to enable the VTB function. For example, when the AC adapter has a constant power of 40 W and an output voltage of 19V, the power protection point is equal to 90% of the constant power of the AC adapter (that is, 36 W). The VTB function has a minimum enabling current of 2 A. To enable the VTB function, the power protection point must be increased to 38 W (19V×2 A=38 W) from the original level of 36 W. However, if the remaining capacity is too low or the battery experiences an aging phenomenon caused by a long duration of use, the power requirement will not be satisfied. Meanwhile, when the computer system has a system total power consumption larger than the constant power of the AC adapter, the computer system may experience an abnormal shut down.

SUMMARY OF THE INVENTION

The invention is directed to a computer system and a power management method thereof.

According to one embodiment of the present invention, a power management method of a computer system is provided. The power management method comprises following steps. A current remaining capacity of a battery is captured, and a previous remaining capacity of the battery is read from the register. Whether the current remaining capacity is equal to the previous remaining capacity is determined. If the current remaining capacity is not equal to the previous remaining capacity, the method determines whether a voltage turbo boost (VTB) function of a smart charger is enabled, wherein the VTB function controls the battery to provide power. If the VTB function is enabled, the method determines whether the current remaining capacity is smaller than a disabling threshold. If the current remaining capacity is smaller than the disabling threshold, the VTB function is disabled and the system constant power protection function is enabled. After the system constant power protection function is enabled, the system constant power protection point is set to be smaller than a constant power of an AC adapter. The battery performs charging when the computer system has a total power consumption smaller than the system constant power protection point.

According to another embodiment of the present invention, a computer system is provided. The computer system comprises a smart charger and a system load. The system load comprises a register and an embedded controller (EC). The smart charger has a voltage turbo boost (VTB) function, which controls the battery to provide power. The EC captures a current remaining capacity of the battery and reads a previous remaining capacity of the battery from the register. The EC determines whether the current remaining capacity is equal to the previous remaining capacity. If the current remaining capacity is not equal to the previous remaining capacity, the EC determines whether the VTB function is enabled. If the VTB function is enabled, the EC determines whether the current remaining capacity is smaller than a disabling threshold. If the current remaining capacity is smaller than the disabling threshold, the EC disables the VTB function but enables the system constant power protection function. After the system constant power protection function is enabled, the method sets the system constant power protection point to be smaller than a constant power of an AC adapter. The battery performs charging when the computer system has a total power consumption smaller than the system constant power protection point.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
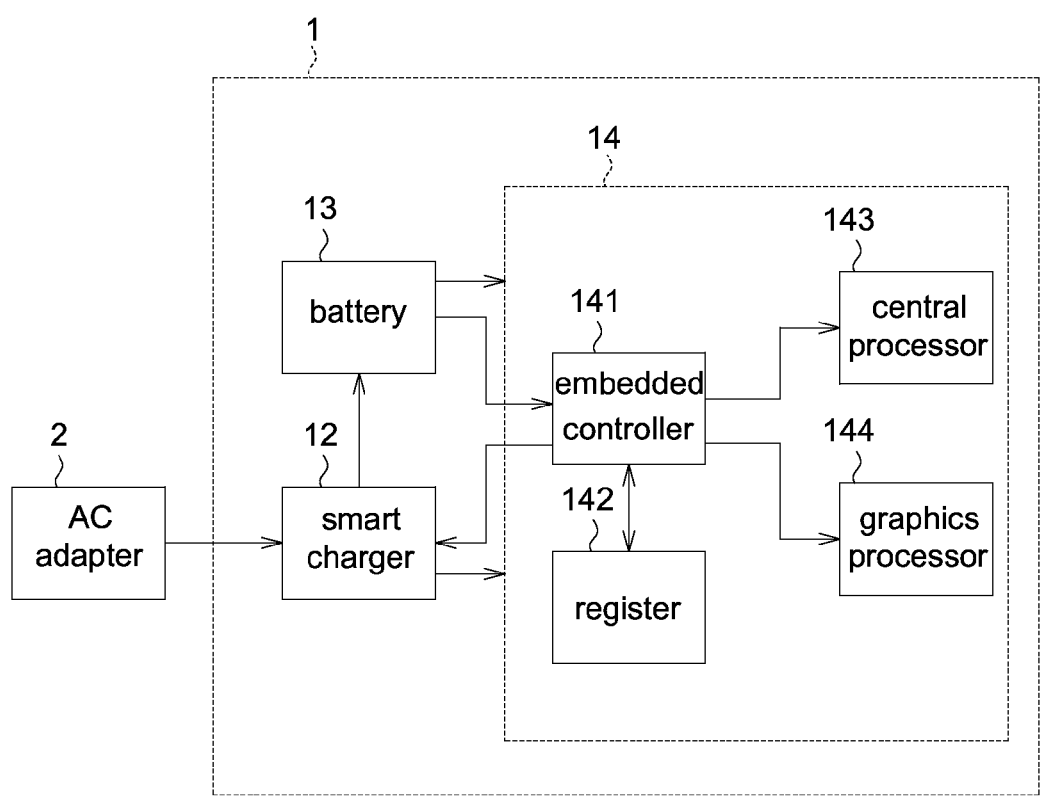
FIG. 1 is a block diagram of a computer system according to an embodiment of the invention.

Refer to Table 1 and FIG. 1 at the same time. Table 1 is a relationship table of VTB function, system constant power protection point and system total power consumption. FIG. 1 is a block diagram of a computer system according to an embodiment of the invention. The AC adapter 2 converts an AC power into a DC power, and provides the DC power to a computer system 1 such as a notebook computer or a tablet PC. The computer system 1 comprises a smart charger 12, a battery 13 and a system load 14. The system load 14 comprises an embedded controller (EC) 141, a register 142, a central processor 143 and a graphics processor 144. The AC adapter 11 converts an AC power into a DC power, which is provided to the battery 13 and the system load 14 via the smart charger 12. The smart charger 12 has a voltage turbo boost (VTB) function, which controls the battery 13 to provide power to the system load 14. The register 142 stores a previous remaining capacity (relative state of charge, RSOC) of the battery 13.

TABLE 1

| VTB function | System constant power protection point | System total power consumption ≥ system constant power protection point | System total power consumption < system constant power protection point |
|---|---|---|---|
| Enabled | Constant power of AC adapter | Both AC Adapter and battery provide power | AC adapter provides power, battery performs charging |
| Disabled | 90% of the constant power of AC adapter | Only AC Adapter provides power | AC adapter provides power, battery performs charging |

When the EC 141 enables the VTB function, the system constant power protection function will be disabled (that is, the system constant power protection function is not enabled). After the system constant power protection function is disabled, the EC 141 sets the system constant power protection point to be equal to a constant power of the AC adapter 2. After the VTB function is enabled by the EC 141, if the system total power consumption is larger than or equal to the system constant power protection point, the AC adapter 2 and the battery 13 together provide power to the system load 14. Conversely, after the VTB function is enabled by the EC 141, if the system total power consumption is smaller than the system constant power protection point, only the AC adapter 2 provides power to the system load 14 and the battery 13 performs charging. For example, the AC adapter 2 has a constant power of 40 W. If the VTB function is enabled by the EC 141, the EC 141 sets the system constant power protection point to be equal to 40 W. After the VTB function is enabled by the EC 141, if the system total power consumption is larger than or equal to 40 W, the AC adapter 2 and the battery 13 together provide power to the system load 14. Conversely, after the VTB function is enabled by the EC 141, if the system total power consumption is smaller than 40 W, only the AC adapter 2 provides power to the system load 14 and the battery 13 performs charging.

When the EC 141 disables the VTB function, the system constant power protection function will be enabled. After the system constant power protection function is enabled, the EC 141 sets the system constant power protection point is equal to 90% of the constant power of the AC adapter 2. After the VTB function is disabled by the EC 141, the system constant power protection point is smaller than the constant power of the AC adapter 2. After the VTB function is disabled by the EC 141, if the system total power consumption is larger than or equal to the system constant power protection point, the AC adapter 2 and the battery 13 together provide power to the system load 14. Conversely, after the VTB function is disabled by the EC 141, if the system total power consumption is smaller than the system constant power protection point, only the AC adapter 2 provides power to the system load 14 and the battery 13 performs charging. For example, the AC adapter 2 has a constant power of 40 W. When the EC 141 disables the VTB function, the EC 141 will set the system constant power protection point to be equal to 36 W. After the VTB function is disabled by the EC 141, if the system total power consumption is larger than or equal to 36 W, the AC adapter 2 and the battery 13 together provide power to the system load 14. Conversely, after the VTB function is enabled by the EC 141, if the system total power consumption is smaller than 36 W, only the AC adapter 2 provides power to the system load 14 and the battery 13 performs charging.

Figure 2:
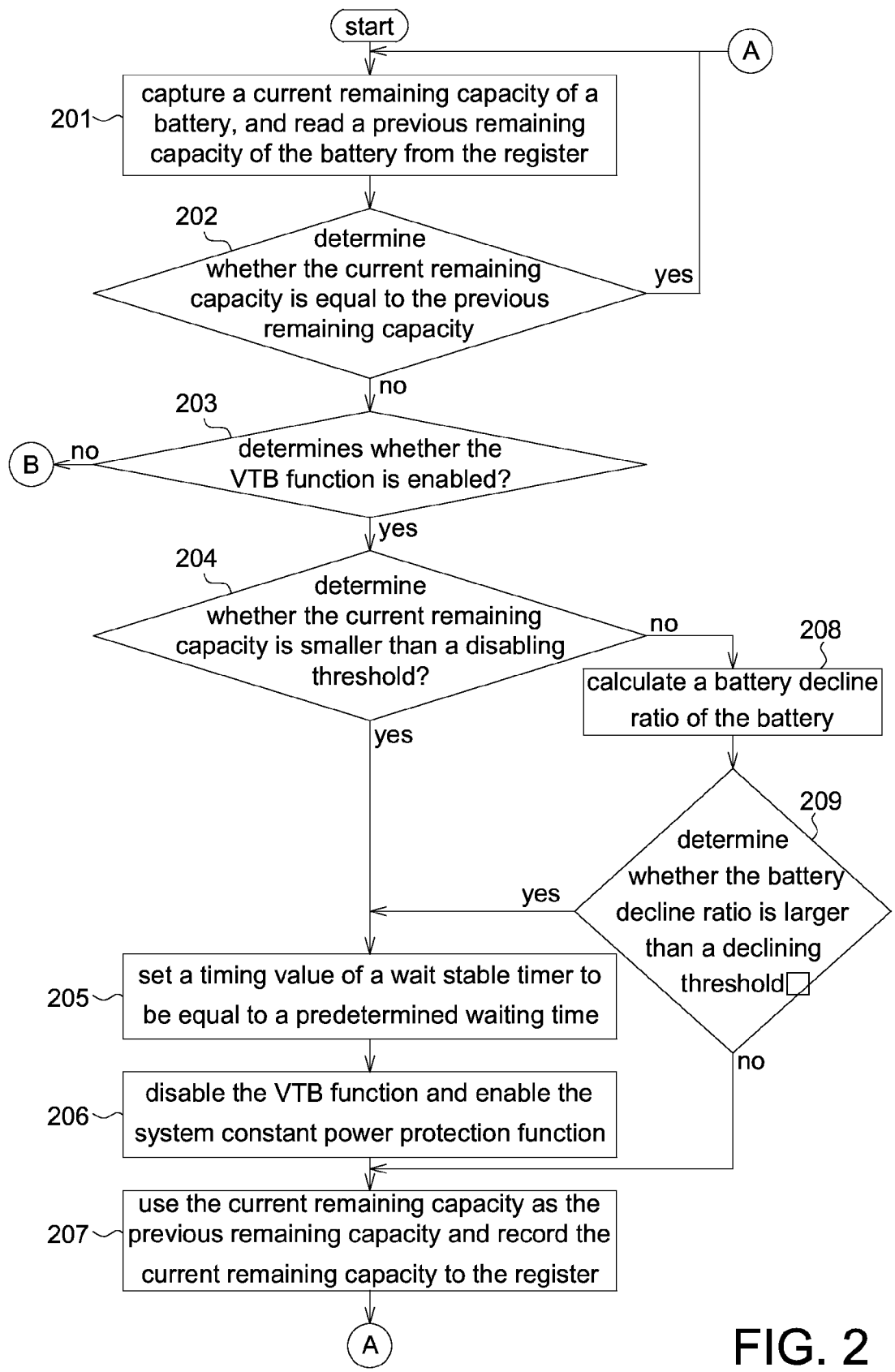
FIG. 2 and FIG. 3 are flowcharts of a power management method of a computer system according to an embodiment of the invention.
Figure 3:
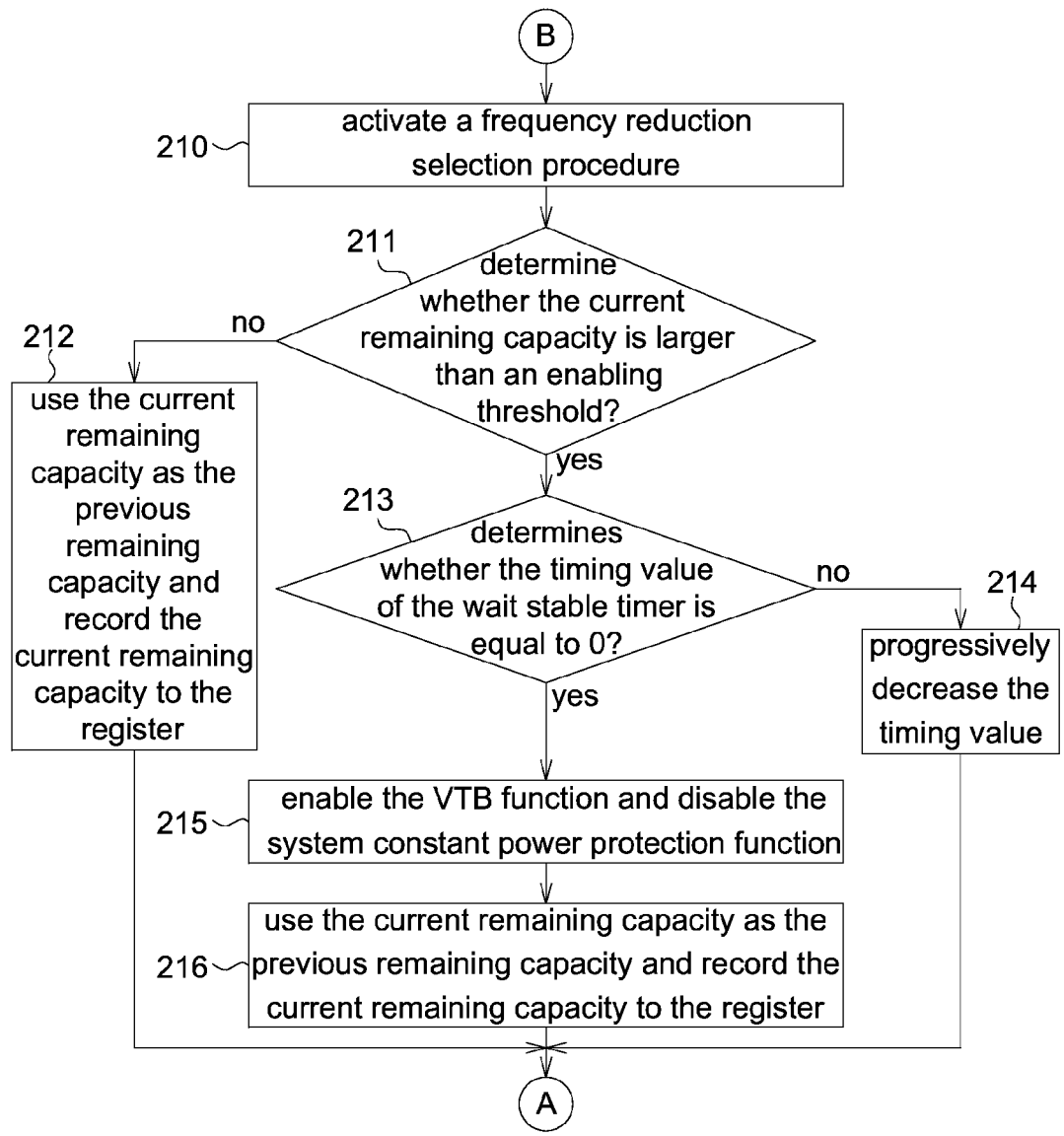

Refer to Table 1, FIG. 1, FIG. 2 and FIG. 3 at the same time. FIG. 2 and FIG. 3 are flowcharts of a power management method of a computer system according to an embodiment of the invention. The power management method of computer system 1 comprises following steps. Firstly, the method begins at step 201, the EC 141 captures a current remaining capacity of a battery 13 and reads a previous remaining capacity of the battery 13 from the register 142. Next, the method proceeds to step 202, the EC 141 determines whether the current remaining capacity is equal to the previous remaining capacity. The current remaining capacity and the previous remaining capacity of the battery 13 most generally are represented by percentage. If the current remaining capacity is equal to the previous remaining capacity, the method repeats step 201. Conversely, if the current remaining capacity is not equal to the previous remaining capacity, the method proceeds to step 203. In step 203, the EC 141 determines whether the VTB function of the smart charger 12 is enabled.

If the VTB function is enabled, the method proceeds to step 204. In step 204, the EC 141 determines whether the current remaining capacity is smaller than a disabling threshold such as 30%. If the current remaining capacity is smaller than the disabling threshold, the method proceeds to step 205. In step 205, the EC 141 sets a timing value of a wait stable timer to be equal to a predetermined waiting time. The wait stable timer, which can be implemented by a program, is between 1-30, and the unit of the predetermined waiting time is second. In the present embodiment, the EC 141 can set the timing value of the wait stable timer to be equal to 10, and the unit of the timing value is second. Then, the method proceeds to step 206, the EC 141 disables the VTB function and enables the system constant power protection function. Then, the method proceeds to step 207, the EC 141 uses the current remaining capacity as the previous remaining capacity and records the current remaining capacity to the register 142.

It should be noted that the battery 13 cannot discharge without a limit. The battery 13 has an output power equal to a product of an output voltage and a discharge current of the battery 13. When the remaining capacity of the battery 13 drops, the output voltage of the battery 13 will drop accordingly. To maintain the output power of the battery 13 unchanged, the discharge current of the battery 13 must increase correspondingly. If the discharge current of the battery 13 is too large, the battery 13 may easily be damaged. The EC 141 of the present embodiment can timely disable the VTB function according to the current remaining capacity to avoid the battery 13 over-discharging.

If the current remaining capacity is not smaller than the disabling threshold, the method proceeds to step 208. In step 208, the EC 141 calculates a battery decline ratio of the battery 13. The battery decline ratio is equal to the previous remaining capacity subtracted by the current remaining capacity. Then, the method proceeds to step 209, the EC 141 determines whether the battery decline ratio is larger than a declining threshold such as 3%. If the battery decline ratio is not larger than the declining threshold, the method proceeds to step 207. Conversely, if the battery decline ratio is larger than the declining threshold, the method proceeds to step 205. Then, the method proceeds to step 206. In step 206, the EC 141 disables the VTB function and enables the system constant power protection function.

It should be noted that the battery 13 will experience a serious aging phenomenon after a long duration of use. As the aging phenomenon of the battery 13 gets worse, the remaining capacity of the battery 13 will significantly decrease although the output power of the battery 13 remains unchanged. The EC 141 of the present embodiment can timely disable the VTB function according to the battery decline ratio to avoid the battery 13 over-discharging.

If the VTB function is disabled (that is, the VTB function is not enabled), the method proceeds to step 210. In step 210, the EC 141 controls the central processor 143 and the graphics processor 144 to activate a frequency reduction selection procedure. Then, the method proceeds to step 211, the EC 141 determines whether the current remaining capacity is larger than an enabling threshold such as 35%. The enabling threshold is smaller than the disabling threshold. If the current remaining capacity is not larger than the enabling threshold, the method proceeds to step 212. In step 212, the EC 141 uses the current remaining capacity as the previous remaining capacity and records the current remaining capacity to the register 142. Conversely, if the current remaining capacity is larger than the enabling threshold, the method proceeds to step 213. In step 213, the EC 141 determines whether a timing value of a wait stable timer is equal to 0. If the timing value of the wait stable timer is not equal to 0, the method proceeds to step 214. In step 214, the EC 141 progressively decreases the timing value. Then, the method repeats step 201. Conversely, if the timing value of the wait stable timer is equal to 0, the method proceeds to step 215. In step 215, the EC 141 enables the VTB function and disables the system constant power protection function. Then, the method proceeds to step 216, the EC 141 uses the current remaining capacity as the previous remaining capacity and records the current remaining capacity to the register 142.

The part of procedures disclosed above will be repeated until the timing value is progressively decreased to 0. The EC 141 will not enable the VTB function or disable the system constant power protection function unless the timing value is equal to 0. For example, before step 214 is performed, the timing value of the wait stable timer is equal to 10. In step 214, after the original timing value is decreased by 1 by the EC 141, the timing value changes to 9 from 10. The part of procedures disclosed above is repeated to progressively decrease the timing value by 1 until the timing value is equal to 0. The EC 141 will not enable the VTB function or disable the system constant power protection function unless the timing value is equal to 0. The EC 141 cannot enable the VTB function unless the predetermined waiting time has passed. Thus, the bounce phenomenon which may occur when the VTB function is enabled or disabled will be avoided.

Figure 4:
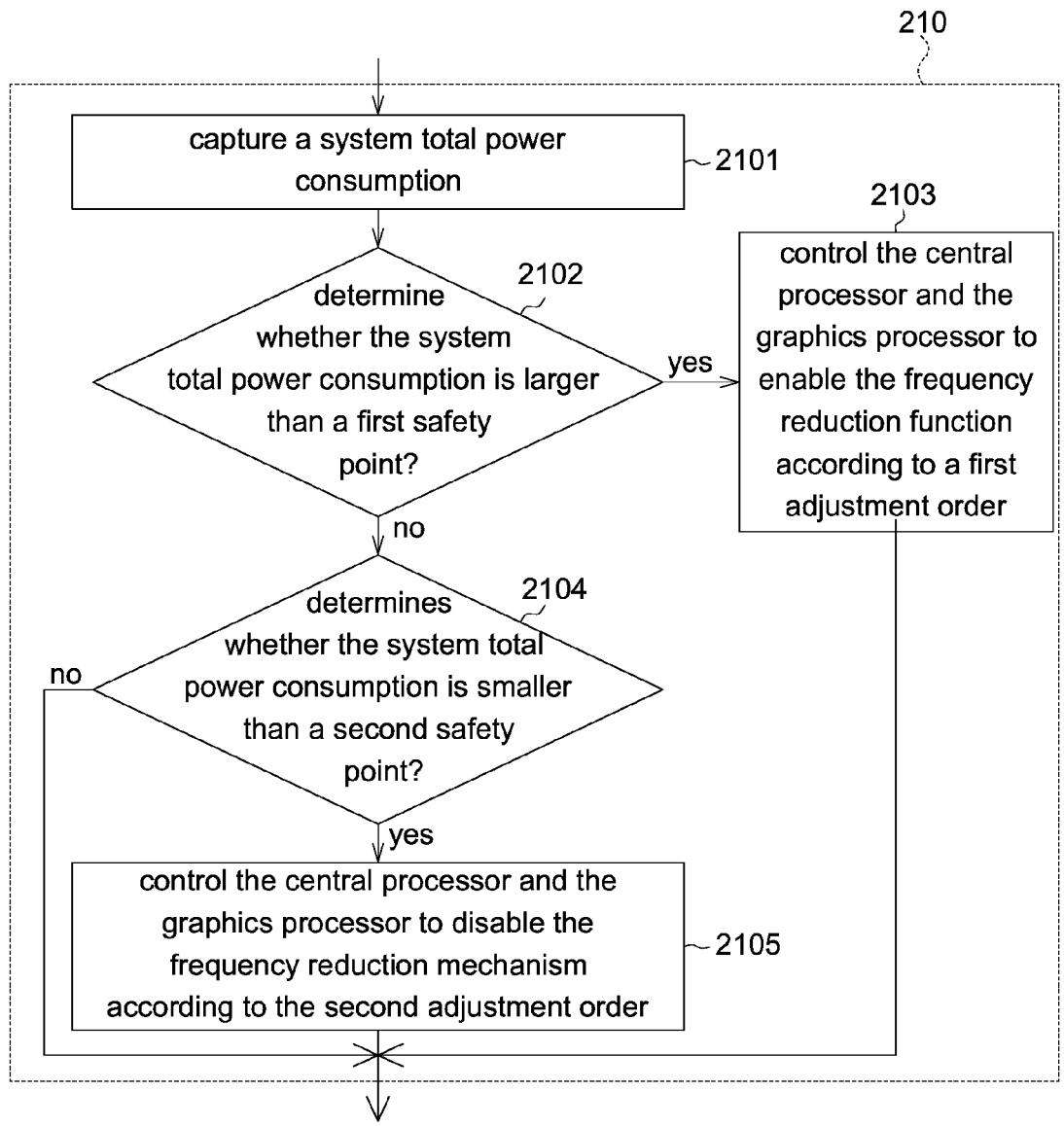
FIG. 4 is a detailed flowchart of step 210.

Refer to Table 2, Table 3, FIG. 1 and FIG. 4 at the same time. Table 2 is a relationship table of the constant power of AC adapter, the first safety point and the second safety point. Table 3 is a relationship table of a frequency reduction selection mode, a frequency reduction function of central processor and a frequency reduction function of graphics processor. FIG. 4 is a detailed flowchart of step 210.

TABLE 2

| Constant power of AC adapter | First safety point (95% of the constant power) | Second safety point (95% of the constant power) |
| --- | --- | --- |
| 40 W | 38 W | 36 W |

TABLE 3

| Frequency reduction selection mode | Frequency reduction function of central processor | Frequency reduction function of graphics processor |
| --- | --- | --- |
| First frequency reduction mode | Disable | Disable |
| Second frequency reduction mode | Disable | Enable |
| Third frequency reduction mode | Enable | Enable |

The said step 210 further comprises step 2101~2105. Firstly, the method begins at step 2101, the EC 141 captures a system total power consumption of the system load 11. Next, the method proceeds to step 2102, the EC 141 determines whether the system total power consumption is larger than a first safety point. The first safety point is such as 95% of the constant power of the AC adapter 2. Most generally, the first safety point is specified in the specification of the AC adapter 2. For example, when the AC adapter 2 has a constant power of 40 W, the first safety point is 38 W.

If the system total power consumption is larger than the first safety point, the method proceeds to step 2103. In step 2103, the EC 141 controls the central processor 143 and the graphics processor 144 to enable the frequency reduction function according to a first adjustment order. The first adjustment order is the first frequency reduction mode, the second frequency reduction mode and the third frequency reduction mode as illustrated in Table 3 in order. In the first frequency reduction mode, the EC 141 disables the frequency reduction functions of the central processor 143 and the graphics processor 144. In the second frequency reduction mode, the EC 141 disables the frequency reduction function of the central processor 143 but enables the frequency reduction function of the graphics processor 144. In the third frequency reduction mode, the EC 141 enables the frequency reduction functions of both the central processor 143 and the graphics processor 144. Therefore, the second frequency reduction mode is more power saving than the first frequency reduction mode, and the third frequency reduction mode is more power saving than the second frequency reduction mode.

For example, suppose the central processor 143 and the graphics processor 144 are originally in the first frequency reduction mode. If the system total power consumption is larger than the first safety point, the EC 141 controls the central processor 143 and the graphics processor 144 to change to the second frequency reduction mode from the first frequency reduction mode according to the first adjustment order. In the second frequency reduction mode, the EC 141 enables the frequency reduction function of the graphics processor 144 to reduce the system total power consumption. Similarly, suppose the central processor 143 and the graphics processor 144 are originally in the second frequency reduction mode. If the system total power consumption is larger than the first safety point, the EC 141 controls the central processor 143 and the graphics processor 144 to change to the third frequency reduction mode from the second frequency reduction mode according to the first adjustment order. In the third frequency reduction mode, the EC 141 enables the frequency reduction functions of both the central processor 143 and the graphics processor 144 to further reduce the system total power consumption.

If the system total power consumption is not larger than the first safety point, the method proceeds to step 2104. In step 2104, the EC 141 determines whether the system total power consumption is smaller than a second safety point. The second safety point, such as 90% of the constant power of the AC adapter 2, is the same as the system constant power protection point which is set after the system constant power protection function is enabled. For example, if the AC adapter 2 has a constant power of 40 W, the second safety point is 36 W. If the system total power consumption is not smaller than the second safety point, the method repeats step 2101. If the system total power consumption is between the first safety point and the second safety point, the central processor 143 and the graphics processor 144 maintain in their respective and original frequency reduction modes.

If the system total power consumption is smaller than the second safety point, the method proceeds to step 2105. In step 2105, the EC 141 controls the central processor 143 and the graphics processor 144 to disable the frequency reduction mechanism according to the second adjustment order. The second adjustment order is opposite to the first adjustment order. That is, the second adjustment order is the third frequency reduction mode, the second frequency reduction mode and the third frequency reduction mode in order.

For example, suppose the central processor 143 and the graphics processor 144 are originally in the third frequency reduction mode. If the system total power consumption is smaller than the second safety point, the EC 141 controls the central processor 143 and the graphics processor 144 to change to the second frequency reduction mod from the third frequency reduction mode according to the second adjustment order. In the second frequency reduction mode, the EC 141 disables the frequency reduction function of the central processor 143. Similarly, suppose the central processor 143 and the graphics processor 144 are originally in the second frequency reduction mode. If the system total power consumption is smaller than the second safety point, the EC 141 controls the central processor 143 and the graphics processor 144 to change to the first frequency reduction mode from the second frequency reduction mode according to the second adjustment order. In the first frequency reduction mode, the EC 141 disables the frequency reduction functions of both the central processor 143 and the graphics processor 144.

Before the EC 141 determines whether the system total power consumption is larger than the first safety point or the second safety point, the EC 141 can capture the system total power consumption and further filter the noises off the captured system total power consumption by using a filter algorithm. The filter algorithm is such as moving average filter (MAF) algorithm or exponential smoothing filter (ESF) algorithm.

The computer system 1 dynamically enables or disables the frequency reduction functions of the central processor 143 and the graphics processor 144. If the system total power consumption is larger than a first safety point, the frequency reduction mechanism is enabled to reduce a system total power consumption. If the system total power consumption is smaller than a second safety point, the frequency reduction function is gradually disabled to enhance the efficiency of the computer system 1. The invention not only quickly and effectively reduces the system total power consumption but also avoids the over-design of the AC adapter and saves costs. Additionally, the invention avoids the computer system 1 being shut down due to the insufficient power supply of the AC adapter.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power management method of a computer system, comprising:
    capturing a current remaining capacity of a battery and reading a previous remaining capacity of the battery from a register;
    determining whether the current remaining capacity is equal to the previous remaining capacity;
    determining whether a voltage turbo boost (VTB) function of a smart charger is enabled if the current remaining capacity is not equal to the previous remaining capacity, wherein the VTB function controls the battery to provide power;
    determining whether the current remaining capacity is smaller than a disabling threshold if the VTB function is enabled; and
    disabling the VTB function and enabling a system constant power protection function if the current remaining capacity is smaller than the disabling threshold, wherein after the system constant power protection function is enabled, and if a total power consumption of the computer system is smaller than the system constant power protection point, a system constant power protection point is set to be smaller than a constant power of an AC adapter and the battery performs charging.

2. The power management method according to claim 1, further comprising:
    using the current remaining capacity as the previous remaining capacity and recording the current remaining capacity to the register after the VTB function is disabled and the system constant power protection function is enabled.

3. The power management method according to claim 2, further comprising:
    setting a timing value of a wait stable timer to be equal to a predetermined waiting time if the current remaining capacity is smaller than the disabling threshold.

4. The power management method according to claim 3, further comprising:
    calculating a battery decline ratio which is equal to the previous remaining capacity subtracted by the current remaining capacity; and
    determining whether the battery decline ratio is larger than a declining threshold;
    wherein the timing value of the wait stable timer is set to be equal to the predetermined waiting time if the battery decline ratio is larger than the declining threshold.

5. The power management method according to claim 4, wherein if the battery decline ratio is not larger than the declining threshold, the current remaining capacity is used as the previous remaining capacity and recorded to the register.

6. The power management method according to claim 4, further comprising:
    activating a frequency reduction selection procedure when the VTB function is disabled;
    determining whether the current remaining capacity is larger than an enabling threshold smaller than the disabling threshold after the frequency reduction selection procedure is activated;
    determining whether the timing value of the wait stable timer is equal to 0 if the current remaining capacity is larger than the enabling threshold;
    enabling the VTB function and disabling the system constant power protection function if the timing value is equal to 0, and setting the system constant power protection point to be equal to the constant power of the AC adapter after the system constant power protection function is disabled.

7. The power management method according to claim 6, further comprising:
using the current remaining capacity as the previous remaining capacity and recording the current remaining capacity to the register after the VTB function is enabled and the system constant power protection function is disabled.

8. The power management method according to claim 6, further comprising:
progressively decreasing the timing value if the timing value is not equal to 0.

9. The power management method according to claim 6, further comprising:
using the current remaining capacity as the previous remaining capacity and recording the current remaining capacity to the register if the current remaining capacity is not larger than the enabling threshold.

10. A computer system, comprising:
a smart charger having a voltage turbo boost (VTB) function, wherein the VTB function controls a battery to provide power;
a system load, comprising:
a register;
an embedded controller (EC) for capturing a current remaining capacity of the battery and reading a previous remaining capacity of the battery from the register, wherein the EC determines whether the current remaining capacity is equal to the previous remaining capacity, if the current remaining capacity is not equal to the previous remaining capacity, the EC determines whether the VTB function is enabled, if the VTB function is enabled, the EC determines whether the current remaining capacity is smaller than a disabling threshold, if the current remaining capacity is smaller than the disabling threshold, the EC disable the VTB function enables a system constant power protection function, and after the system constant power protection function is enabled, a system constant power protection point is set to be smaller than a constant power of an AC adapter, and the battery performs charging if the computer system has a total power consumption is smaller than the system constant power protection point.

11. The computer system according to claim 10, wherein after the VTB function is disabled and the system constant power protection function is enabled, the EC uses the current remaining capacity as the previous remaining capacity and records the current remaining capacity to the register.

12. The computer system according to claim 11, wherein if the current remaining capacity is smaller than the disabling threshold, the EC sets a timing value of a wait stable timer to be equal to a predetermined waiting time.

13. The computer system according to claim 12, wherein the EC calculates a battery decline ratio which is equal to the previous remaining capacity subtracted by the current remaining capacity, the EC determines whether the battery decline ratio is larger than a declining threshold, and if the battery decline ratio is larger than the declining threshold, the EC sets the timing value of the wait stable timer to be equal to the predetermined waiting time.

14. The computer system according to claim 13, wherein if the battery decline ratio is not larger than the declining threshold, the EC uses the current remaining capacity as the previous remaining capacity and records the current remaining capacity to the register.

15. The computer system according to claim 13, further comprising a central processor and a graphics processor, wherein when the VTB function is disabled, the central processor and the graphics processor are controlled to activate a frequency reduction selection procedure, and after the frequency reduction selection procedure is activated, the EC determines whether the current remaining capacity is larger than an enabling threshold smaller than the disabling threshold, if the current remaining capacity is larger than the enabling threshold, the EC determines whether the timing value of the wait stable timer is equal to 0, if the timing value is equal to 0, the EC enables the VTB function and disables the system constant power protection function, and after the system constant power protection function is disabled, the EC sets the system constant power protection point to be equal to the constant power of the AC adapter.

16. The computer system according to claim 15, wherein after the VTB function is enabled and the system constant power protection function is disabled, the EC uses the current remaining capacity as the previous remaining capacity and records the current remaining capacity to the register.

17. The computer system according to claim 15, wherein if the timing value is not equal to 0, the EC progressively decreases the timing value.

18. The computer system according to claim 15, wherein if the current remaining capacity is not larger than the enabling threshold, the EC uses the current remaining capacity as the previous remaining capacity and records the current remaining capacity to the register.

* * * * *